March 12, 1968     N. RUIZ     3,372,690
INSULATED LUNCH BOX
Filed June 6, 1966
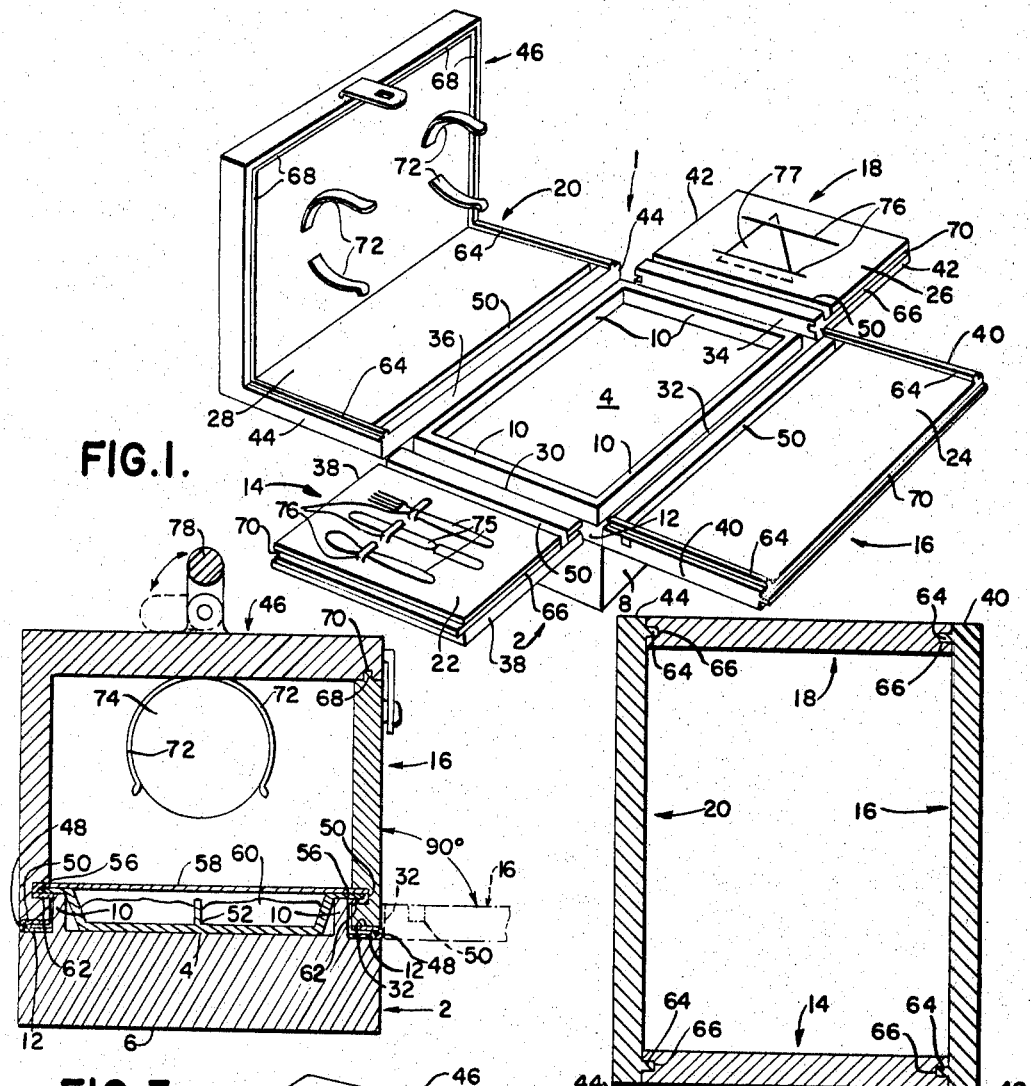
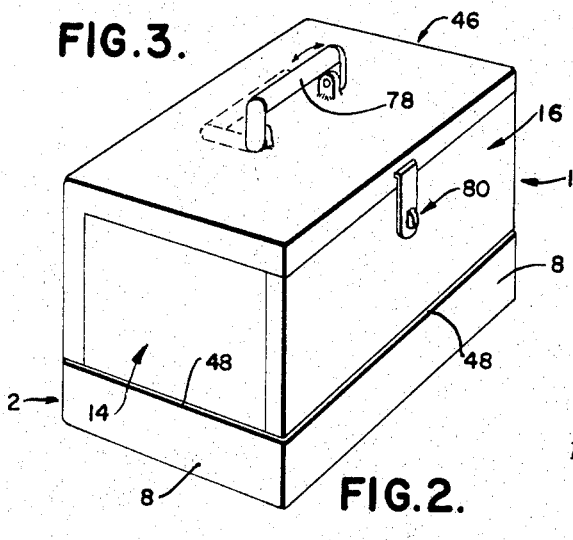
INVENTOR
Noelia Ruiz
BY *Clive H. Bramson*
ATTORNEY

United States Patent Office 3,372,690
Patented Mar. 12, 1968

3,372,690
INSULATED LUNCH BOX
Noelia Ruiz, 477 Hicks St., Brooklyn, N.Y. 11231
Filed June 6, 1966, Ser. No. 555,462
7 Claims. (Cl. 126—261)

ABSTRACT OF THE DISCLOSURE

A portable lunch box for carrying a preheated prepared food tray having an insulated base portion, an insulated top and four sides, said sides having grooves which coact with the edge of the food tray to thereby secure the tray upon said base when the lunch box is closed.

---

This invention relates to portable lunch boxes and more particularly to a lunch box which is thermally insulated and therefore especially suited to carrying a preheated, prepared food tray whereby the heated food will remain heated over extended periods of time. In view of the thermal insulating capability of the present device, cold as well as hot prepared meals may be similarly preserved.

Additionally, the present device provides a plurality of table surface areas which extend laterally of the prepared food tray upon opening the lunch box and exposing the food tray contained therein. The aforesaid table surface areas may accordingly be utilized where there is an absence of an otherwise usable table surface or to avoid utilizing an otherwise available but unsanitary table surface.

Another object of the present invention resides in the provision of an improved lunch box capable of carrying a conventional compartmentalized shallow tray of the type usually filled with a complete frozen meal which need only be heated prior to serving.

A further object of this invention is to provide a device in accordance with the foregoing whereby the food tray and a covering thereover will, when the lunch box is closed, be held securely to prevent spillage of the tray contents during the transportation and handling thereof.

Another object of the instant invention is to provide a lunch box capable of carrying, in addition to a food tray, a beverage, eating utensils and other appurtenances required during the consumption of the meal.

Another general object of the present invention is to provide a device of the described character which will be simple in structure, extremely insulative in nature, economical of manufacture and highly effective in use.

Other objects and advantages of the insulated lunch box will be set forth in part hereinafter and in part will be obvious herefrom, or may be learned by practice of the invention, the same being realized and attained by means of the structure defined and pointed out in the appended claims.

The accompanying drawings referred to herein and constituting a part hereof, illustrate one embodiment of the invention, and together with the description, serve to explain the principles of the invention.

FIGURE 1 is a perspective view of an insulated lunch box in opened form but with the food tray removed therefrom;

FIGURE 2 is a perspective view of the lunch box shown in closed carrying condition;

FIGURE 3 is a cross-sectional elevational view of the device including a food tray, a covering therefor and the means for securing said food tray and cover against movement or upset within the lunch box;

FIGURE 4 is a top cross-sectional view illustrating the tongue and groove association of the side portions of the lunch box when the latter is in the closed condition; and FIGURE 5 is a perspective view of the food tray illustrating the compartmentalized nature and the peripheral flange thereof.

Referring now in detail to the present preferred embodiment of the invention illustrated in the accompanying drawings, FIGURES 1 and 2 show the insulated lunch box designated generally by numeral 1 in the opened and closed positions, respectively, as heretofore described.

More specifically, and with further reference to FIGURES 3 and 4 as well, the box will be seen to comprise an insulated base portion designated generally by numeral 2 which includes upper tray-supporting surface 4, bottom wall 6 and side surfaces 8; vertical shoulder 10 projecting upwardly of said tray-supporting surface 4 and disposed inwardly of said side surfaces 8 to provide a flat horizontal flange 12 peripherally of said base portion.

Side portions of the box, designated generally as 14, 16, 18 and 20, each include inner surfaces 22, 24, 26, and 28, bottom edges 30, 32, 34 and 36 and side edges 38, 40, 42 and 44, respectively, top portion 46 being integrally related with respect to said side portion 20 and normally disposed with respect thereto as shown in FIGURES 1–3 of the drawings.

The bottom edges of the respective side portions are hingedly connected by hinges 48 to said flat horizontal flange 12 as particularly shown in FIGURE 3, hinges 48 being adapted for 90° angular movement whereby each side portion is capable of swinging between vertical and horizontal positions as shown in FIGURES 1 and 3 of the drawings. Although the hinge is not shown in detail, it will be appreciated that a hinge of the described character is well known in the art and is of conventional construction.

Thus, as will be observed in FIGURE 3, when the lunch box is in the closed position, the inner surfaces of said side portions are in parallelism with said vertical shoulder 10 and top portion 46 is in parallelism with tray-supporting surface 4. Each side portion is further provided with a groove 50 extending substantially the distance between the side edges thereof, each said groove being arranged inwardly of and parallel with respect to the bottom edge of the respective side portion.

Food tray 52 adapted for use with the present insulated lunch box is shown in FIGURE 5 wherein it will be seen to include sectionalized compartments 54 and to be provided with horizontal peripheral flange 56. With reference again to FIGURE 3, food tray 52 is received upon said tray-supporting surface 4 whereby said peripheral flange 56 in part rests upon said vertical shoulder 10 and in part is received within grooves 50 of said side portions when the latter are vertically disposed. Tray-covering means 58 completely covers the food tray and therefore the contents 60 thereof, edge 62 of said cover means being folded over horizontal flange 56 of said food tray whereby, as shown, said edge of the cover means and said horizontal flange are concurrently received and retained within said grooves 50 when the lunch box is in the closed position.

Tongue means 64 are provided as shown adjacent the side edges 40 and 44 of side portions 16 and 20 and groove means 66 are provided along side edges 38 and 42 of side portions 14 and 18 respectively, said tongue and groove means being adapted to mate, as shown in FIGURE 4 of the drawings, when said side portions are vertically arranged, and to thereby provide sealing means at the closure seams of the device. In furtherance of these ends, tongues 68 and grooves 70 are provided as illustrated in FIGURES 1 and 3, to also provide advantageous sealing between said top portion and side portions.

Spring clips 72 are connected to the top portion 46 as shown to enable securement of a container for liquids to said top portion. A container 74 as shown in FIGURE 3, when secured by said spring clips 72, depends from said top portion when the lunch box is in closed position. It has been determined that where said container is of the non-insulated type such as a glass jar, a hot liquid contained therein will radiate heat to heat the interior of the closed box to thereby prolong the heated condition of the food tray.

Eating utensils 75 and a napkin 77 may readily be secured within slots 76 provided in the side portions as illustrated in FIGURE 1. A carrying handle 78 and a locking assembly 80 are provided, each being of conventional nature. The materials of construction are preferably expanded polystyrene or polyurethane although other suitable insulating materials may be utilized.

Although the preferred embodiment of the insulated lunch box has been described, it will be understood that within the purview of this invention various changes may be made in the forms, details, proportion and arrangement of parts, the combination thereof and mode of operation, which generally stated consists in a device capable of carrying out the objects set forth, as disclosed and defined in the appended claims.

What is claimed is:

1. A portable lunch box for carrying a preheated prepared food tray, comprising an insulated base portion having an upper tray-supporting surface, an insulated top and four side portions, said top portion being integrally related with respect to one of said side portions and normally disposed with respect thereto, said side portions each having an inner surface, a bottom and side edges, the bottom edge of each said side portions being hingedly connected to said base portion whereby when said side portions are disposed vertically with respect to said upper tray-supporting surface, said top portion is parallel with respect to said upper tray-supporting surface, and said side portions including groove means within at least one of said side portions for retaining a food tray securely with respect to said tray-supporting surface when said side portions are vertically disposed with respect to said supporting surface.

2. A portable lunch box as set forth in claim 1 wherein said base portion comprises a bottom wall and side surfaces, a vertical shoulder projecting upwardly from said tray-supporting surface, said shoulder being disposed inwardly of said side surfaces to provide an horizontal flange peripherally of said base portion, the bottom edges of said side portions being connected to said horizontal flange.

3. A portable lunch box as set forth in claim 2 wherein said groove means for retaining a food tray comprises a groove provided in the inner surface of each said side portions, each groove extending substantially the distance between the side edges of each respective side portion and inwardly of and parallel with respect to the bottom edge thereof.

4. A portable lunch box as set forth in claim 3 including a food tray having an horizontal flange disposed peripherally thereabout, said food tray being removably receivable upon said tray-supporting surface whereby said horizontal flange in part rests upon said vertical shoulder and in part is received within the grooves of said side portions when the latter are vertically disposed.

5. A portable lunch box as set forth in claim 4 including tongue and groove means provided adjacently of the side edges of respective side portions, said tongue and groove means being in mating relation when said side portions are vertically arranged, and closure means for securing said top portion to a side portion.

6. A portable lunch box as set forth in claim 4 including spring clip means connected to said top portion whereby a container for liquids can be secured to said clip means when said lunch box is closed, said container when so secured, being spacedly disposed with respect to said food tray, said container when filled with a hot liquid being adapted to radiate heat to thereby prolong the heated condition of the food tray.

7. A portable lunch box as set forth in claim 4 including cover means for said food tray, the edge of said cover means being folded over the horizontal flange of said food tray whereby said edge of the cover means and said horizontal flange are concurrently received and retained within the grooves of said side portions when the latter are vertically disposed.

References Cited

UNITED STATES PATENTS

| 1,194,570 | 8/1916 | Stuart | 220—6 |
| 2,763,366 | 9/1956 | Smith et al. | 220—20 X |
| 3,054,501 | 9/1962 | Maynard | 206—4 |

FOREIGN PATENTS

| 324,046 | 1/1930 | Great Britain. |

CHARLES J. MYHRE, *Primary Examiner.*